(12) United States Patent
Matsui et al.

(10) Patent No.: US 8,257,615 B2
(45) Date of Patent: Sep. 4, 2012

(54) ELECTROLYTE COMPOSITION AND PHOTOELECTRIC CONVERSION ELEMENT INCORPORATING THE SAME

(75) Inventors: Hiroshi Matsui, Sakura (JP); Kenichi Okada, Sakura (JP); Takayuki Kitamura, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/789,135

(22) Filed: May 27, 2010

(65) Prior Publication Data
US 2010/0233531 A1    Sep. 16, 2010

Related U.S. Application Data

(63) Continuation of application No. PCT/JP2008/071673, filed on Nov. 28, 2008.

(30) Foreign Application Priority Data

Nov. 30, 2007 (JP) ................. 2007-311352

(51) Int. Cl.
*H01B 1/12* (2006.01)
*H01M 6/16* (2006.01)
(52) U.S. Cl. ......... 252/500; 429/188; 429/339; 429/340
(58) Field of Classification Search .......... 252/500; 429/188, 339, 340
See application file for complete search history.

(56) References Cited

U.S. PATENT DOCUMENTS

| | | | |
|---|---|---|---|
| 6,552,843 B1 * | 4/2003 | Tench et al. | 359/321 |
| 6,835,495 B2 * | 12/2004 | Michot et al. | 429/188 |
| 2005/0045851 A1 * | 3/2005 | He et al. | 252/62.3 R |
| 2005/0211292 A1 | 9/2005 | Chittibabu et al. | |
| 2007/0191612 A1 * | 8/2007 | Ohno et al. | 548/335.1 |
| 2007/0195398 A1 * | 8/2007 | Lin et al. | 359/265 |
| 2009/0032105 A1 | 2/2009 | Inoue et al. | |
| 2010/0233531 A1 * | 9/2010 | Matsui et al. | 429/188 |

FOREIGN PATENT DOCUMENTS

| | | |
|---|---|---|
| JP | 2664194 B1 | 6/1997 |
| JP | 2002-289267 A | 10/2002 |
| JP | 2004-087387 A | 3/2004 |
| JP | 2007-250473 A | 9/2007 |
| JP | 2007-257930 A | 10/2007 |
| JP | 2007-294288 A | 11/2007 |
| TW | 200705731 A | 2/2007 |
| WO | 2006/109769 A1 | 10/2006 |
| WO | 2007/055392 A1 | 5/2007 |

OTHER PUBLICATIONS

Stathatos et al., "Dye-sensitized photoelectrochemical solar cells based on nanocomposite organic-inorganic materials", Journal of Photochemistry and Photobiology A: Chemistry, 169 (2005), 57-61.*
Papageorgiou, N. et al., "The Performance and Stability of Ambient Temperature Molten Salts for Solar Cell Applications", Journal of the Electrochemical Society, Oct. 1996. pp. 3099-3108, vol. 143.
O'Regan, B., et al. "A low-cost, high-efficiency solar cell based on dye-sensitized colloidal $TiO_2$ films," Nature, Oct. 24, 1991, pp. 737-740, vol. 353.
Chinese Office Action dated Jun. 4, 2012 issued in Chinese Patent Application No. 200880118419.X.

* cited by examiner

*Primary Examiner* — Douglas McGinty
(74) *Attorney, Agent, or Firm* — Sughrue Mion, PLLC

(57) ABSTRACT

An electrolyte composition includes an ionic liquid and a solvent, wherein the solvent contains a material made of at least one of sulfolane and derivatives thereof, and a content of the material is 5 to 40 mass % of the total content of the electrolyte composition.

4 Claims, 1 Drawing Sheet

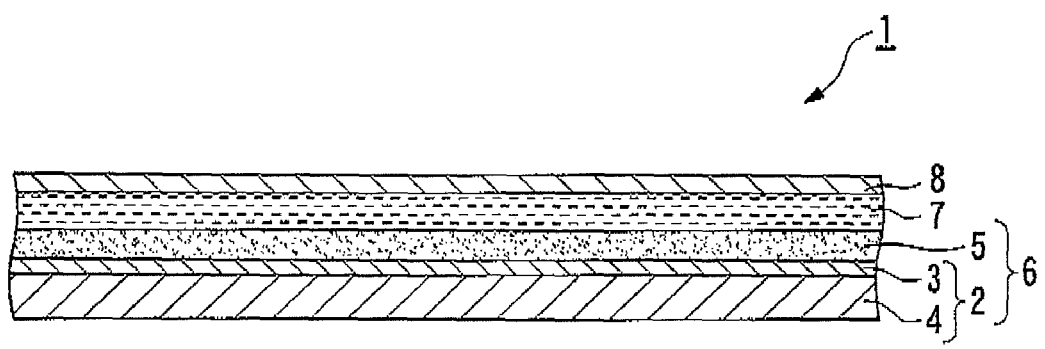

ELECTROLYTE COMPOSITION AND PHOTOELECTRIC CONVERSION ELEMENT INCORPORATING THE SAME

BACKGROUND OF THE INVENTION

1. Field of the Invention

The present invention relates to an electrolyte composition and a photoelectric conversion element incorporating the same.

Priority is claimed on Japanese Patent Application No. 2007-311352, filed Nov. 30, 2007, the content of which is incorporated herein by reference.

2. Background Art

In general, a dye-sensitized photovoltaic cell is structured as proposed by Michael Graetzel, Switzerland, et al., Nature, United Kingdom, 1991, vol. 353, p. 737. The dye-sensitized solar cell has received considerable attention as a new class of high-conversion efficiency and low-cost photovoltaic cell (see, for example, Japanese Patent Publication No. 2664194 and Michael Graetzel et al., Nature, United Kingdom, 1991, vol. 353, p. 737).

A dye-sensitized photovoltaic cell usually includes a working electrode and a counter electrode. The working electrode has a construction in which a photosensitized dye-loaded porous film made of oxide semiconductor fine particles (i.e., nanoparticles), such as titanium dioxide, is formed on a transparent conductive electrode substrate. The counter electrode is provided opposite the working electrode. An electrolyte containing an oxidation-reduction pair is located between the working electrode and the counter electrode. Such a dye-sensitized photovoltaic cell functions as a photoelectric conversion element in which photosensitized dye sensitizes oxide semiconductor fine particles upon absorption of incident light, such as sunlight, so as to convert light energy including visible light into electricity.

A conventional volatile electrolyte solution including, for example, acetonitrile as a solvent, volatilizes especially when left outside for a long period of time. Such volatilization of the solution may cause deterioration in cell characteristics and make it difficult to provide enough durability as a device. An amorphous photovoltaic cell, for example, requires stability for 1,000 hours or more in durability evaluation test in a wet heat environment of 85° C./85% RH and in a temperature cycle of −40° C. to 90° C. To address the problem of solvent volatilization, an attempt has been made to use a non-volatile ionic liquid with high charge-transportability as the electrolyte solution (see, for example, N. Papageorgiou et. al., Journal of the Electrochemical Society J. Electrochem. Soc.), the United States, 1996, vol. 143 (10), p. 3099).

In order to obtain a photosensitized photovoltaic cell with high energy conversion efficiency which does not decrease even in a hot environment, an electrolyte composition including an imidazolium salt, water or alcohol in an amount of more than 10 wt % to less than or equal to 50 wt % and iodine has been proposed (see, for example, Japanese Unexamined Patent Application, First Publication No. 2002-289267).

An ionic liquid, however, generally has higher viscosity than that of a volatile solvent, such as acetonitrile. Such high viscosity may disadvantageously decrease a charge transport rate in an electrolyte and thus produce low output as compared to a case in which a volatile electrolyte solution is used. Although many attempts have been made to lower the viscosity of the ionic liquid, only limited materials have both stability and low viscosity. Accordingly, existing ionic liquids have not achieved low viscosity comparable to that of volatile electrolyte solutions.

Low-viscosity ionic liquids whose viscosity is decreased through addition of water are also reported. It is considered, however, that water may have various adverse effects on components of the element. Accordingly, although such low-viscosity ionic liquids have improved initial performance, it is not necessarily easy to achieve durability.

Although another attempt of mixing other volatile solvents has been made, it is still impossible to completely prevent volatilization of the solvent component. It is particularly difficult to maintain stable durability under severe durability tests as described above.

SUMMARY OF THE INVENTION

The invention has been made in view of the aforementioned circumstances. An object of the invention is to provide an electrolyte composition with improved initial performance and excellent durability, and a photoelectric conversion element incorporating the same.

To solve the aforementioned problems, the present inventors have intensively studied on the cause of difficulty in maintaining stable durability of an electrolyte composition that includes a solvent. The inventors have finally found that high volatility, especially high vapor pressure, of the solvent may be the principal cause of the difficulty. The inventors continued studying and finally found that the aforementioned problems can be solved with the invention described below.

An electrolyte composition according to an aspect of the invention includes: an ionic liquid and a solvent, wherein the solvent contains a material made of at least one of sulfolane and derivatives thereof, and a content of the material is 5 to 40 mass % of the total content of the electrolyte composition.

A photoelectric conversion element of the invention includes the above-described electrolyte composition as an electrolyte.

According to the invention, an electrolyte composition with improved initial performance and excellent durability, and a photoelectric conversion element incorporating the same are provided.

BRIEF DESCRIPTION OF THE DRAWING

FIG. 1 is a cross-sectional view of an embodiment of a photoelectric conversion element according to an aspect of the invention.

DESCRIPTION OF REFERENCE NUMERALS

1: dye-sensitized photovoltaic cell (photoelectric conversion element)
2: electrode substrate
3: conductive layer
4: transparent substrate
5: dye-absorbed oxide semiconductor porous film
6: working electrode
7: electrolyte layer
8: counter electrode

DESCRIPTION OF THE PREFERRED EMBODIMENTS

Hereinafter, the invention will be described in detail with reference to embodiments thereof.

An electrolyte composition of the invention includes: an ionic liquid and a solvent, wherein the solvent contains a material made of at least one of sulfolane and derivatives thereof, and a content of the material is 5 to 40 mass % of the total content of the electrolyte composition.

Examples of ionic liquids used in the invention include, but are not limited to, a room temperature molten salt that is liquid at room temperature.

Examples of cations of the room temperature molten salt include salts of an imidazolium cation, a pyrrolidinium cation, a pyridinium cation, an ammonium cation, a phosphonium cation and a sulfonium cation.

Examples of the imidazolium cations include a 1,3-dimethylimidazolium cation, a 1-ethyl-3-methylimidazolium cation, a 1-propyl-3-methylimidazolium cation, a 1-butyl-3-methylimidazolium cation, a 1-hexyl-3-methylimidazolium cation, a 1-octyl-3-methylimidazolium cation, a 1-decyl-3-methylimidazolium cation, a 1-ethyl-2,3-dimethylimidazolium cation, a 1-butyl-2,3-dimethylimidazolium cation and a 1-phenylmethyl-3-methylimidazolium cation.

Examples of the pyrrolidinium cations include a 1-butyl-1-methylpyrrolidinium cation, a 1-hexyl-1-methylpyrrolidinium cation and a 1-octyl-1-methylpyrrolidinium cation.

Examples of the pyridinium cations include a 1-ethylpyridinium cation, a 1-butylpyridinium cation, a 1-hexylpyridinium cation, a 1-butyl-3-methylpyridinium cation, a 1-butyl-4-methylpyridinium cation, a 1-butyl-3,4-dimethylpyridinium cation and a 1-butyl-3,5-dimethylpyridinium cation.

Examples of the ammonium cations include an ethylammonium cation, a butylammonium cation, a tributylammonium cation, tetrapropylammonium cation, a tetrabuthylammonium cation and a trimethylpropylammonium cation.

Examples of the phosphonium cations include a trihexyl(tetradecyl)phosphonium cation, a tetrabutylphosphonium cation and a tributyl(2-methoxyethyl)phosphonium cation.

Examples of the sulfolane cation include a triethylsulfonium cation and a tributylsulfonium cation.

Examples of anions of the room temperature molten salt include salts of an iodide anion, a bis(trifluoromethylsulfonyl)imide anion, a bis(fluorosulfonyl)imide anion, a dicyanamide anion, a thiocyanate anion, a tetracyanoborate anion, a tricyanomethane anion, a chloride anion, a bromide anion, a hexafluorophosphate anion, a tetrafluoroborate anion, a dimethylphosphate anion, a trifluoromethanesulfonic acid anion and an ethylsulphato anion.

These salts may be used alone or in combination thereof.

Solvents used in the invention contain a material made of at least one of sulfolane and derivatives thereof. Vapor pressure of the solvent is preferably low. In particular, sulfolane and the derivatives thereof have vapor pressure that is low enough to effectively prevent solvent volatilization and thus maintain stable durability.

Examples of sulfolane contained in the solvent include tetrahydrothiophene 1,1-dioxide and tetramethylene sulfone.

Examples of sulfolane derivatives contained in the solvent include, but are not limited to, 3-methylsulfolane, 2,4-dimethylsulfolane, 2-sulfolane fluoride, 3-sulfolane fluoride, 3,4-sulfolane fluoride, 2,2,4-sulfolane fluoride, 2-propylsulfolane fluoride, 2-ethylsulfolane fluoride, 4,5-dihydro-3-methylthiophene-1,1-dioxide, 3,4-epoxy tetrahydrothiophene-1,1-dioxide, 2-methyltetrahydrothiophene-1,1-dioxide, tetrahydrothiophene-3-ol-1,1-dioxide, 3-sulfolene, 2,4-dimethyl-3-sulfolene, trans-3,4-dihydroxytetrahydrothiophene-1,1-dioxide, 3-chloro-2,5-dihydrothiophene-1,1-dioxide, N,N-dimethyltetrahydro-3-thiopheneamine-1,1-dioxide, 4-chloro-1,1-dioxo-tetrahydro thiophene-3-ol and 2,3-dihydro-3-thiocyanate thiophene-1,1-dioxide.

Sulfolane and the derivatives thereof may be used alone or in combination thereof.

The content of the material made of at least one of sulfolane and the derivatives thereof is 5 to 40 mass %, preferably 8 to 25 mass %, and more preferably 10 to 20 mass % of the total content of the electrolyte composition. If the content of the material is less than 5 mass % with respect to the total content of the electrolyte composition, the addition effect becomes insufficient. On the other hand, if the content of the material exceeds 40 mass % of the total content of the electrolyte composition, no further additional effects can be expected while the solvent may volatilize even at a faster rate.

The content of the material made of at least one of sulfolane and the derivatives thereof in the electrolyte composition is preferably 8 to 25 mass % because such a range of content may provide low viscosity that improves initial performance and suppressing volatilization that maintains durability. The content of the material is more preferably 10 to 20 mass % because such a range of content may provide further low viscosity that further improves initial performance and suppressing volatilization that maintains durability.

A redox couple may be added to the electrolyte composition according to an embodiment of the invention, although it is not an essential component. The redox couple is preferably added to the electrolyte composition according to an embodiment of the invention that is used, for example, as a dye-sensitized photovoltaic cell.

Examples of the oxidation-reduction couple include, but are not limited to, a halogen redox couple consisting of a halide ion, such as an iodide ion ($I^-$), a bromide ion ($Br^-$) and a chloride ion ($Cl^-$), and a polyhalide ion, such as $I_3^-$, $I_5^-$, $I_7^-$, $Br_3^-$, $Cl_2I^-$, $CH_2^-$, $Br_2I^-$ and $BrI_2^-$.

The halogen redox couple can be obtained by, for example, adding an iodine/iodide ion pair and a bromine/bromide ion pair as oxidation-reduction couples. A source of supply of the iodide ion or the bromide ion may be a lithium salt, a quaternized imidazolium salt and a tetrabutylammonium salt. These salts may be used alone or in combination thereof.

Various additives and solvents, such as tert-butylpyridine, N-methylbenzimidazol and a guanidinium salt can be added to the electrolyte composition according to an embodiment of the invention without impairing quality and characteristic of the electrolyte composition as needed.

Gelator, such as a high-molecular gelator, a low-molecular gelator, various nano particles and carbon nanotube may be added suitably to the electrolyte composition according to an embodiment of the invention as needed. The electrolyte composition is thus quasi-solidified to provide a so-called gel electrolyte. The electrolyte composition according to an embodiment of the invention is preferably prepared in a clean room, in a glove box, or in a dry environment to exclude impurities, such as foreign substance and water.

The above-described electrolyte composition is preferably used as, for example, an electrolyte for a photoelectric conversion element, such as a dye-sensitized photovoltaic cell.

Solvents used in conventional electrolyte compositions have disadvantageously high viscosity, which prevents improvement in the initial performance of the element. Such solvents also have insufficient durability, which may cause decrease in electrolytic conductivity over time, thereby deteriorating photoelectric conversion characteristics of the photoelectric conversion element. In contrast, the above-described electrolyte composition exhibits improved initial performance and excellent durability as will be described in the following examples. The provided electrolyte composition exhibits improved initial performance and excellent durability either in its liquid state and gel state.

An index representing the initial performance (hereinafter, referred to as "an initial performance index") used herein is obtained in the following manner. As an ionic liquid, 1-hexyl-3-methylimidazolium iodide (hereinafter, referred to as "HMImI") is employed. A ratio of an initial value of the photoelectric conversion efficiency of a targeted electrolyte composition ("initial conversion efficiency B") with respect to an initial value of the photoelectric conversion efficiency of an electrolyte composition to which no solvent is added ("standard initial conversion efficiency A") is computed. The resulting ratio is then multiplied by 100 to provide an index value ("initial performance value C"). Their relationship can be expressed in the following equation: Initial performance value C=(Initial conversion efficiency B/Standard initial conversion efficiency A)×100.

An index representing durability (hereinafter referred to as "a durability index") is obtained in the following manner. A ratio of a measured value of the photoelectric conversion efficiency of a targeted electrolyte composition measured after 1,000 hours since the electrolyte composition was immersed in a 85° C. constant-temperature chamber ("conversion efficiency D after 1,000 hours") with respect to the standard initial conversion efficiency A. The resulting ratio is multiplied by 100 to provide an index value ("durability performance value E"). Their relationship can be expressed in the following equation: Durability performance value E=(Conversion efficiency D after 1,000 hours/Standard initial conversion efficiency A)×100. A value obtained by multiplying a ratio of the durability performance value E with respect to the initial performance value C by 100 also serves as a durability rate of change F representing a durability index. Their relationship can be expressed in the following equation: Durability performance value F=(Durability performance value E/initial performance value C)×100.

The electrolyte composition may also be made into a gel, which leaves no possibility of leaking (i.e., liquid leakage) of the electrolyte composition even if the electrolyte composition is exposed during the fabrication process thereof or upon breakage of the cell. The electrolyte composition is therefore excellent in productivity and handlability.

Next, an embodiment of the photoelectric conversion element incorporating the above-described electrolyte composition will be described.

FIG. 1 is a cross-sectional view showing an exemplary schematic structure of a dye-sensitized photovoltaic cell as an embodiment of the photoelectric conversion element according to the invention.

A dye-sensitized photovoltaic cell 1 includes a working electrode 6 and a counter electrode 8. The working electrode 6 has a construction in which a photosensitized dye-loaded oxide semiconductor porous film 5 made of oxide semiconductor fine particles, such as titanium dioxide, is formed on a transparent electrode substrate 2. The counter electrode 8 is provided opposite the working electrode 6. An electrolyte layer 7 filled with the above-described electrolyte composition is formed between the working electrode 6 and the counter electrode 8.

The transparent electrode substrate 2 includes a conductive layer 3 made of an electrically conductive material formed on a transparent substrate 4, such as a glass plate and a plastic sheet.

The material for the transparent substrate 4 preferably has high optical transparency for intended purposes. Examples of the materials for the transparent substrate 4 include, other than glass, a transparent plastic sheet, such as polyethylene terephthalate (PET), polyethylenenaphthalate (PEN), polycarbonate (PC) and polyethersulphone (PES).

From the viewpoint of optical transparency of the transparent electrode substrate 2, the conductive layer 3 is preferably made of transparent oxide semiconductor materials. Examples of the transparent oxide semiconductor materials include indium tin oxide (ITO), tin oxide ($SnO_2$) and fluorine doped tin oxide (FTO). These materials may be used alone or in combination thereof. The conductive layer 3, however, is not limited to those described, and may be suitably selected for intended purposes from the viewpoints of optical transparency and conductivity. In order to improve collecting efficiency of a generated current, a metal wiring layer consisting of gold, silver, platinum, aluminum, nickel and titanium may be used together at such an area ratio that optical transparency of the transparent electrode substrate 2 is not significantly impaired. The metal wiring layer may be arranged in any pattern, such as grid, stripe and comb so that the collecting efficiency and incident light quantity are well-balanced.

The conductive layer 3 may be formed by a known method suitable for the material used. For example, if the conductive layer 3 is made of an oxide semiconductor material, such as ITO and FTO, the conductive layer 3 forming method including sputtering, CVD, spray pyrolysis deposition (SPD) and vapor deposition may be employed. The conductive layer 3 is usually formed to have a film thickness of about 0.05 to 2.0 μm from the viewpoint of optical transparency and conductivity.

The oxide semiconductor porous film 5 is a porous thin film with thickness of about 0.5 to 50 μm. The oxide semiconductor porous film 5 consists mainly of oxide semiconductor fine particles with an average particle diameter of 1 to 1,000 nm. Examples of the oxide semiconductor materials include titanium dioxide ($TiO_2$), tin oxide ($SnO_2$), tungsten oxide ($WO_3$), zinc oxide (ZnO) and niobium oxide ($Nb_2O_5$). These materials are used alone or in combination thereof.

The oxide semiconductor porous film 5 may be formed, for example, by a method in which a dispersion solution obtained by dispersing commercially available oxide semiconductor fine particles in a desired dispersion medium, or a colloidal solution which may be prepared using a sol-gel method, is applied, after desired additives added thereto as needed, onto the transparent electrode substrate 2 by a known process, such as screen printing, ink jet printing, roll coating, doctor blading, spin coating and spray coating. The substrate is then dried and sintered. Other methods include: an electrophoretic deposition method in which the electrode substrate 2 is immersed in a colloidal solution to make the oxide semiconductor fine particles adhere to the electrode substrate 2 by electrophoresis; and a method in which a foaming agent is mixed in a colloidal solution or a dispersion solution, which is applied to the electrode substrate 2 and then sintered to form a porous film.

The sensitizing dye loaded in the oxide semiconductor porous film 5 is not particularly limited and may be suitably selected in accordance with, intended purposes and the material of the oxide semiconductor porous film. Examples of the sensitizing dye include a ruthenium complex and an iron complex in which those of ligands having a bipyridine structure and a terpyridine structure, a porphyrinic or phthalocyanic metal complex, and a derivative of organic dye, such as eosin, rhodamine, meroeyanine and coumarin.

The counter electrode 8 may be formed by, for example, depositing a thin film of a conductive oxide semiconductor material, such as ITO and FTO on a substrate of a non-conducting material, such as glass, or alternatively vapor-depositing or applying a conductive material, such as gold, platinum and a carbon material onto a substrate to form an electrode. A layer of platinum, carbon or conductive polymer may alternatively be formed on a thin film of a conductive oxide semiconductor material, such as ITO and FTO.

The counter electrode 8 may be prepared by, for example, applying chloroplatinic acid onto a substrate which is then subject to a heat treatment to provide a platinum layer. Alternatively, a platinum layer may be formed on the substrate by vapor deposition or sputtering.

Examples of methods of forming the electrolyte layer 7 consisting of the above-described electrolyte composition on the working electrode 6 include, but are not limited to, a method of depositing the electrolyte composition dropwise on the working electrode 6. Alternatively, the electrolyte may be applied to the working electrode 6 or the counter electrode 8 to form the electrolyte layer 7. The electrolyte composition may alternatively be filled between the electrodes by, for example, a capillary phenomenon. The electrolyte composition may fully permeate the oxide semiconductor porous film 5 and fulfill voids in the film 5.

In the thus-obtained photoelectric conversion element according to an embodiment of the invention, the solvent constituting the electrolyte composition contains a material made of at least one of sulfolane and a derivative thereof, and a content of the material is 5 to 40 mass % of the total content of the electrolyte composition. The photoelectric conversion element has excellent durability and causes no electrolytic deterioration or electrolytic loss due to, for example, solvent volatilization when used as a photoelectric conversion element in a dye-sensitized photovoltaic cell. The photoelectric conversion element achieves the photoelectric conversion characteristics of improved initial performance and excellent durability. Further, the electrolyte composition may also be made into a gel, which prevents leaking of the electrolyte from, for example, a clearance of a container and scattering of the electrolyte upon breakage of the photoelectric conversion element. Thus, the photoelectric conversion element has, for example, excellent durability as compared to a case in which a liquid electrolyte solution is used.

A dye-sensitized photovoltaic cell produced by incorporating the photoelectric conversion element according to an embodiment of the invention causes no electrolytic deterioration or electrolytic loss due to, for example, solvent volatilization. The dye-sensitized photovoltaic cell can thus achieve photoelectric conversion characteristics of improved initial performance and excellent durability. Further, the electrolyte composition may also be made into a gel, which prevents leaking of the electrolyte from, for example, a clearance of a container and scattering of the electrolyte upon breakage of the photoelectric conversion element. Thus, the photoelectric conversion element has, for example, excellent durability as compared to a case in which a liquid electrolyte solution is used.

EXAMPLES

Examples 1 to 16

Preparation of Liquid Electrolyte Composition

As an ionic liquid, 1-hexyl-3-methylimidazolium iodide ("HMImI") was used. In the ionic liquid, 0.45M of iodine, 0.1M of guanidinium thiocyanate and 0.5M of N-methylbenzimidazol were dissolved to prepare an electrolyte solution which contains an iodine/iodide ion as an oxidation-reduction couple.

To the resulting electrolyte solution, any of sulfolane, 2-methylsulfolane, 3-methylsulfolane, 2,4-dimethyl-3-sulfolane, 3-hydroxysulfolane, 3-sulfolene and 2,4-dimethyl-3-sulfolene shown in Table 1 was added as a solvent in an amount shown in Table 1 with respect to the total content of the electrolyte composition to obtain electrolyte compositions of Examples 1 to 16.

Each of the obtained electrolyte composition inevitably contains impurities such as water in an amount less than 1% with respect to the total content of the electrolyte composition.

Fabrication of Photoelectric Conversion Element Relating to Examples

Titanium oxide paste (PST21NR, a product of JGC Catalysts and Chemicals Ltd.) was applied to a surface of a glass substrate having an FTO film formed thereon at a side of the FTO film (i.e., a conductive layer) by screen printing. After the paste was dried, the glass substrate having an FTO film formed thereon was subject to a heat treatment at 500° C. for 1 hour to produce a titania porous electrode. The obtained electrode was immersed in a solution containing ruthenium complex (N719 dye) for 24 hours or more to make the sensitizing dye absorbed on a titania particle surface to provide a working electrode.

As a counter electrode, an FTO glass electrode substrate with a platinum catalyst layer deposited thereon by sputtering was prepared.

A 30-μm-thick hot melt sheet (HIMILAN, a product of Du Pont-Mitsui Polychemicals Co., Ltd.) was disposed between the working electrode and the counter electrode to bond the electrodes together.

Each of the electrolyte compositions of Examples 1 to 16 was injected from an electrolyte solution inlet into between the working electrode and the counter electrode to form an electrolyte layer. Then, the obtained stack was sealed to provide a dye-sensitized photovoltaic cell used as a test cell.

Injection of the electrolyte composition and sealing were performed in a glove box with a moisture content controlled to not more than 1 ppm.

Comparative Examples 1 to 6

Preparation of Liquid Electrolyte Composition

An electrolyte solution was prepared in the same manner as in Example 1. To the resulting electrolyte solution, any of sulfolane, γ-butyrolactone or propylene carbonate shown in Table 1 was added as a solvent in an amount shown in Table 1 with respect to the total content of the electrolyte composition to obtain the electrolyte compositions of Comparative Examples 1 to 6. Each of the obtained electrolyte composition inevitably contains impurities, such as water in an amount less than 1% with respect to the total content of the electrolyte composition.

Fabrication of Photoelectric Conversion Element Relating to Comparative Examples 1 to 6

Dye-sensitized photovoltaic cells used as test cells were fabricated in the same manner as Example 1 except that electrolyte compositions of Comparative Examples 1 to 6 were injected between a working electrode and a counter electrode to form an electrolyte layer.

Photoelectric Conversion Characteristics of Test Cells

As described above, based on the initial performance index and the durability index, the initial performance value C, the durability performance value E and the durability rate of change F were measured for each produced test cell (Examples 1 to 16 and Comparative Examples 1 to 6).

The results are shown in Table 1.

TABLE 1

| | Ionic Liquid | Solvent | Solvent Content (wt %) | Initial Performance Value C | Durability Performance Value E | Durability Rate of Change F |
|---|---|---|---|---|---|---|
| Example 1 | HMImI | Sulfolane | 5 | 107 | 117 | 109 |
| Example 2 | HMImI | Sulfolane | 8 | 116 | 130 | 112 |
| Example 3 | HMImI | Sulfolane | 10 | 126 | 142 | 113 |
| Example 4 | HMImI | Sulfolane | 15 | 131 | 151 | 115 |
| Example 5 | HMImI | Sulfolane | 20 | 134 | 153 | 114 |
| Example 6 | HMImI | Sulfolane | 25 | 143 | 143–146 | 100–102 |
| Example 7 | HMImI | Sulfolane | 26 | 150 | 149 | 99 |
| Example 8 | HMImI | Sulfolane | 30 | 152 | 146 | 96 |
| Example 9 | HMImI | Sulfolane | 35 | 155 | 147 | 95 |
| Example 10 | HMImI | Sulfolane | 40 | 156 | 148 | 95 |
| Example 11 | HMImI | 2-methylsulfolane | 15 | 126 | 141 | 112 |
| Example 12 | HMImI | 3-methylsulfolane | 15 | 121 | 138 | 114 |
| Example 13 | HMImI | 2,4-dimethyl-3-sulfolane | 15 | 125 | 133 | 106 |
| Example 14 | HMImI | 3-hydroxysulfolane | 15 | 118 | 124 | 105 |
| Example 15 | HMImI | 3-sulfolene | 15 | 125 | 143 | 114 |
| Example 16 | HMImI | 2,4-dimethyl-3-sulfolene | 15 | 122 | 132 | 108 |
| Comparative Example 1 | HMImI | (none) | 0 | 100 | 102 | 102 |
| Comparative Example 2 | HMImI | Sulfolane | 3 | 102 | 117 | 115 |
| Comparative Example 3 | HMImI | γ-butyrolactone | 8 | 123 | 106 | 86 |
| Comparative Example 4 | HMImI | γ-butyrolactone | 15 | 136 | 105 | 77 |
| Comparative Example 5 | HMImI | γ-butyrolactone | 26 | 155 | 79 | 51 |
| Comparative Example 6 | HMImI | propylene carbonate | 10 | 125 | 101 | 81 |

Example 17

An electrolyte composition and a dye-sensitized photovoltaic cell used as a test cell were prepared in the same manner as in Example 4 except that 1-propyl-3-methylimidazolium iodide (hereinafter, referred to as "PMImI") was used as an ionic liquid.

Comparative Example 7

An electrolyte composition and a dye-sensitized photovoltaic cell used as a test cell were prepared in the same manner as in Comparative Example 1 except that PMImI was used as an ionic liquid.

As described above, based on the initial performance index and the durability index, the initial performance value C, the durability performance value E and the durability rate of change F were measured for each produced test cell (Example 17 and Comparative Example 7).

The results are shown in Table 2.

Example 18

An electrolyte composition and a dye-sensitized photovoltaic cell used as a test cell were prepared in the same manner as in Example 4 except that 1-ethyl-3-methylimidazolium bis(trifluoromethylsulfonyl)imide (hereinafter, referred to as "EMImFSI") was used as an ionic liquid.

Comparative Example 8

An electrolyte composition and a dye-sensitized photovoltaic cell used as a test cell were prepared in the same manner as in Comparative Example 1 except that EMImFSI was used an ionic liquid.

As described above, based on the initial performance index and the durability index, the initial performance value C, the durability performance value E and the durability rate of change F were measured for each produced test cell (Example 18 and Comparative Example 8).

TABLE 2

| | Ionic Liquid | Solvent | Solvent Content (wt %) | Initial Performance Value C | Durability Performance Value E | Durability Rate of Change F |
|---|---|---|---|---|---|---|
| Example 17 | PMImI | Sulfolane | 15 | 112 | 120 | 107 |
| Comparative Example 7 | PMImI | (none) | 0 | 90 | 95 | 106 |

The results are shown in Table 3.

TABLE 3

|  | Ionic Liquid | Solvent | Solvent Content (wt %) | Initial Performance Value C | Durability Performance Value E | Durability Rate of Change F |
|---|---|---|---|---|---|---|
| Example 18 | EMImFSI | Sulfolane | 15 | 125 | 123 | 98 |
| Comparative Example 8 | EMImFSI | (none) | 0 | 109 | 107 | 98 |

Example 19

An electrolyte composition and a dye-sensitized photovoltaic cell used as a test cell were prepared in the same manner as in Example 4 except that a mixture of PMImI and 1-ethyl-3-methylimidazolium tetracyanoborate (hereinafter, referred to as "EMImTCB") at a ratio of PMImI:EMImTCB=6:4 was used as an ionic liquid (hereinafter, the mixture will be referred to as "PMImI+EMImTCB").

Comparative Example 9

An electrolyte composition and a dye-sensitized photovoltaic cell used as a test cell were prepared in the same manner as in Comparative Example 1 except that PMImI+EMImTCB was used as an ionic liquid.

As described above, based on the initial performance index and the durability index, the initial performance value C, the durability performance value E and the durability rate of change F were measured for each produced test cell (Example 19 and Comparative Example 9).

The results are shown in Table 4.

TABLE 4

|  | Ionic Liquid | Solvent | Solvent Content (wt %) | Initial Performance Value C | Durability Performance Value E | Durability Rate of Change F |
|---|---|---|---|---|---|---|
| Example 19 | PMImI + EMImTCB | Sulfolane | 15 | 138 | 153 | 111 |
| Comparative Example 9 | PMImI + EMImTCB | (none) | 0 | 116 | 125 | 108 |

Example 20

An electrolyte composition and a dye-sensitized photovoltaic cell used as a test cell were prepared in the same manner as in Example 4 except that a mixture of EIMImFSI and 1-ethyl-3-methylimidazolium ethyl sulphate (hereinafter, referred to as "EMImEtS") at a ratio of EIMImFSI:EMImEtS=6:4 was used as an ionic liquid (hereinafter, the mixture will be referred to as "EIMImFSI+EMImEtS").

Comparative Example 10

An electrolyte composition and a dye-sensitized photovoltaic cell used as a test cell were prepared in the same manner as Comparative Example 1 except that EIMImFSI+EMImEtS was used as an ionic liquid.

As described above, based on the initial performance index and the durability index, the initial performance value C, the durability performance value E and the durability rate of change F were measured for each produced test cell (Example 20 and Comparative Example 10).

The results are shown in Table 5.

TABLE 5

|  | Ionic Liquid | Solvent | Solvent Content (wt %) | Initial Performance Value C | Durability Performance Value E | Durability Rate of Change F |
|---|---|---|---|---|---|---|
| Example 20 | EIMImFSI + EMImEtS | Sulfolane | 15 | 118 | 130 | 110 |
| Comparative Example 10 | EIMImFSI + EMImEtS | (none) | 0 | 105 | 109 | 104 |

Example 21 and Comparative Example 11

Preparation of Gel Electrolyte Composition

An electrolyte solution was prepared in the same manner as in Example 1.

To the resulting electrolyte solution, sulfolane was added as a solvent in an amount that its content with respect to the total content of the electrolyte composition was as shown in Table 6. Then, silicon dioxide ($SiO_2$) nanoparticles were added to the electrolyte solution in an amount that its content was 5 mass % with respect to the total content of the electrolyte composition to obtain quasi-solid-state (gel) electrolyte compositions of Example 21 and Comparative Example 11.

Fabrication of Photoelectric Conversion Element

A dye-sensitized photovoltaic cell used as a test cell in Example 21 and a dye-sensitized photovoltaic cell used as a test cell in Comparative Example 11 were prepared in the same manner as Example 1 except that, in order to provide an electrolyte layer on the working electrode, each of the quasi-solid-state electrolyte compositions of Example 21 and Comparative Example 11 was applied on an oxide semiconductor porous film of the working electrode, then the counter electrode was stacked on the porous film, and the electrodes were sealed.

Photoelectric Conversion Characteristics of Test Cells

As described above, based on the initial performance index and the durability index, the initial performance value C, the durability performance value E and the durability rate of change F were measured for each produced test cell (Example 21 and Comparative Example 11).

The results are shown in Table 6.

TABLE 6

| | Ionic Liquid | Solvent | Solvent Content (wt %) | Initial Performance Value C | Durability Performance Value E | Durability Rate of Change F |
|---|---|---|---|---|---|---|
| Example 21 | HMImI + 5 wt % $SiO_2$ (gel) | Sulfolane | 15 | 151 | 159 | 105 |
| Comparative Example 11 | HMImI + 5 wt % $SiO_2$ (gel) | (none) | 0 | 120 | 121 | 101 |

As can be seen from the results shown in Tables 1 to 6, the test cells of Examples 1 to 21 in which the electrolyte compositions according to the aspects of the invention were used exhibited improved initial performance and excellent durability as compared to Comparative Examples 1 to 11. In the electrolyte compositions according to the aspects of the invention, sulfolane or derivatives thereof were used as a solvent in each of the ionic liquids (HMImI, PMImI, EMIm-FSI, PMImI+EMImITCB and EIMImFSI+EMImEtS) in a amount that the content of sulfolane or derivatives thereof was not less than 5 mass % and not more than 40 mass % with respect to the total content of the electrolyte composition.

As can be seen from the results shown in Table 1, it was found that, if the content of sulfolane was less than 5 mass % with respect to the total content of the electrolyte composition, the effect was reduced.

Fabrication of Large-Area Photoelectric Conversion Element

Titanium oxide paste (PST21NR, a product of JGC Catalysts and Chemicals Ltd.) was applied to a surface of a 140 mm×140 mm glass substrate having an FTO film formed thereon at a side of the FTO film (i.e., a conductive layer) by screen printing. After the paste was dried, the glass substrate having an FTO film formed thereon was subject to a heat treatment at 500° C. for 1 hour to produce a titanium oxide porous layer. A current collecting wiring consisting of a silver printed circuit of 300 µm in circuit width and 10 µm in film thickness was formed on the substrate. The silver wiring was covered with a dense protective film to avoid corrosion by an iodine electrolyte solution. The resulting substrate was immersed in a solution containing ruthenium complex (N719 dye) for 24 hours or more the sensitizing dye loaded by the titania particle surface to provide a working electrode.

The counter electrode was produced by depositing a platinum catalyst layer on a 40-µm-thick titanium foil by sputtering.

In order to provide an electrolyte layer on the working electrode, each of the quasi-solid-state electrolyte compositions of Example 21 and Comparative Example 11 was applied on an oxide semiconductor porous film of the working electrode, then the counter electrode was stacked on the porous film, and the obtained stack were sealed. In this manner, a dye-sensitized photovoltaic cell used as a test cell in Example 21 and a dye-sensitized photovoltaic cell used as a test cell in Comparative Example 11 were prepared.

Injection of the electrolyte composition and sealing were performed in a glove box with a moisture content controlled to not more than 1 ppm.

Photoelectric Conversion Characteristics of Test Cells

Photoelectric conversion characteristics of the thus-obtained test cells were measured.

For each test cell, an initial value of photoelectric conversion efficiency (i.e., initial conversion efficiency) and a value of the photoelectric conversion efficiency measured after 1,000 hours since the electrolyte composition was immersed in a 85° C. constant-temperature chamber were measured and compared with each other.

As a result, excellent output and stability were exhibited in the test cell of the Example.

The foregoing results demonstrate that the electrolyte composition according to an embodiment of the invention provides stable characteristics when used for a large-area photoelectric conversion element in either as a liquid electrolyte composition or as a gel electrolyte composition as long as a material made of at least one of sulfolane and derivatives thereof is used as a solvent, and a content of the material is 5 to 40 mass % of the total content of the electrolyte composition.

It is also found that improved initial performance is provided by the low viscosity and durability is maintained by the volatilization control as long as a material made of at least one of sulfolane and derivatives thereof is used as a solvent, and a content of the material is 8 to 25 mass % of the total content of the electrolyte composition.

It is also found that further improved initial performance is provided by the further low viscosity and durability is maintained by the volatilization control as long as a material made of at least one of sulfolane and derivatives thereof is used as a solvent, and a content of the material is 10 to 20 mass % of the total content of the electrolyte composition.

Consequently, effectiveness of the electrolyte compositions according to the embodiments of the invention is demonstrated.

The electrolyte compositions according to the embodiments of the invention can be preferably used as an electrolyte used for a photoelectric conversion element, such as a dye-sensitized photovoltaic cell. The electrolyte composition may be useful as an electrolyte for various elements having electric or electrochemical operations.

What is claimed is:

1. An electrolyte composition comprising: an ionic liquid which is a room temperature molten salt and a solvent, wherein
the solvent comprises at least one of sulfolane and derivatives thereof, and a content of the solvent is 10 to 20 mass % of the total content of the electrolyte composition;
wherein a cation of the room temperature molten salt is an imidazolium cation, and an anion of the room temperature molten salt is an iodide anion.

2. A photoelectric conversion element comprising the electrolyte composition according to claim 1 as an electrolyte.

3. The electrolyte composition according to claim 1, wherein the solvent comprises 3-methylsulfolane.

4. The electrolyte composition according to claim 1, wherein the solvent comprises sulfolane.

* * * * *